(12) United States Patent
Seo et al.

(10) Patent No.: US 10,333,739 B2
(45) Date of Patent: Jun. 25, 2019

(54) METHOD FOR TRANSMITTING OR RECEIVING SIGNAL IN WIRELESS COMMUNICATION SYSTEM SUPPORTING D2D COMMUNICATION AND APPARATUS FOR PERFORMING SAME

(71) Applicant: LG ELECTRONICS INC., Seoul (KR)

(72) Inventors: Inkwon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/747,749

(22) PCT Filed: Aug. 23, 2016

(86) PCT No.: PCT/KR2016/009312
§ 371 (c)(1),
(2) Date: Jan. 25, 2018

(87) PCT Pub. No.: WO2017/034296
PCT Pub. Date: Mar. 2, 2017

(65) Prior Publication Data
US 2018/0219701 A1    Aug. 2, 2018

Related U.S. Application Data

(60) Provisional application No. 62/208,806, filed on Aug. 23, 2015.

(51) Int. Cl.
*H04L 25/02* (2006.01)
*H04L 5/00* (2006.01)
(Continued)

(52) U.S. Cl.
CPC .......... *H04L 25/0224* (2013.01); *H04J 11/00* (2013.01); *H04J 13/00* (2013.01);
(Continued)

(58) Field of Classification Search
CPC combination set(s) only.
See application file for complete search history.

(56) References Cited

U.S. PATENT DOCUMENTS

2010/0296429 A1\* 11/2010 Han ...................... H04L 12/189
370/312
2015/0117375 A1    4/2015 Sartori et al.
(Continued)

FOREIGN PATENT DOCUMENTS

WO    2015030548    3/2015
WO    2015115837    8/2015

OTHER PUBLICATIONS

PCT International Application No. PCT/KR2016/009312, Written Opinion of the International Searching Authority dated Dec. 2, 2016, 18 pages.
(Continued)

*Primary Examiner* — Yee F Lam
(74) *Attorney, Agent, or Firm* — Lee Hong Degerman Kang Waimey

(57) ABSTRACT

A method for receiving a signal through a physical format adaptable to a wireless communication environment by a device supporting D2D communication according to an embodiment of the present invention comprises the steps of: receiving a synchronization signal from a transmission node on the basis of one of a first physical format and a second physical format; and performing synchronization with the transmission node on the basis of the synchronization signal, wherein when the second physical format is used, M synchronization symbols in addition to N synchronization sym-
(Continued)

bols used in the first physical format are set in the same sub-frame, and a total of (N+M) synchronization symbols included in the same sub-frame may include a first synchronization symbol to which a first Zadoff-Chu sequence generated through first root indexes is mapped, and a second synchronization symbol to which a second Zadoff-Chu sequence generated through second root indexes is mapped.

12 Claims, 12 Drawing Sheets

(51) Int. Cl.
| | |
|---|---|
| *H04J 11/00* | (2006.01) |
| *H04J 13/00* | (2011.01) |
| *H04W 8/00* | (2009.01) |
| *H04W 56/00* | (2009.01) |
| *H04W 72/04* | (2009.01) |
| *H04W 48/12* | (2009.01) |

(52) U.S. Cl.
CPC ........... *H04L 5/0048* (2013.01); *H04W 8/005* (2013.01); *H04W 56/001* (2013.01); *H04W 72/0406* (2013.01); H04L 5/0057 (2013.01); H04W 48/12 (2013.01)

(56) References Cited

U.S. PATENT DOCUMENTS

| | | | |
|---|---|---|---|
| 2015/0156757 A1 | 6/2015 | Kalhan | |
| 2016/0128009 A1* | 5/2016 | Yoon ...................... | H04W 4/70 370/350 |
| 2017/0353936 A1* | 12/2017 | Zhang .................... | H04L 5/005 |
| 2018/0167989 A1* | 6/2018 | Yasukawa ................ | H04J 11/00 |
| 2018/0184390 A1* | 6/2018 | Wu ..................... | H04L 27/2613 |
| 2018/0199298 A1* | 7/2018 | Wakabayashi .... | H04W 56/0015 |
| 2018/0199299 A1* | 7/2018 | Wakabayashi ...... | H04W 56/002 |
| 2018/0212733 A1* | 7/2018 | Khoryaev ............. | H04L 5/0051 |
| 2018/0234928 A1* | 8/2018 | Yasukawa ............... | H04W 4/04 |
| 2018/0332491 A1* | 11/2018 | Eckardt ................ | H04L 5/0051 |

OTHER PUBLICATIONS

Nokia, "D2D Synchronization for out-of-coverage and partial coverage discovery", 3GPP TSG RAN WG1 Meeting #81, R1-153064, May 2015, 2 pages.

* cited by examiner

FIG. 2
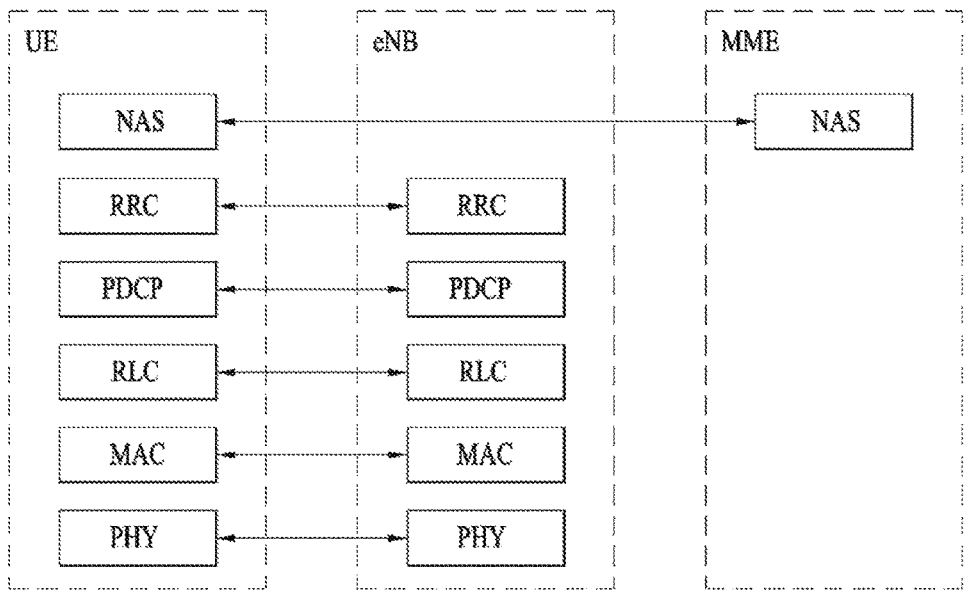
(a) CONTROL-PLANE PROTOCOL STACK
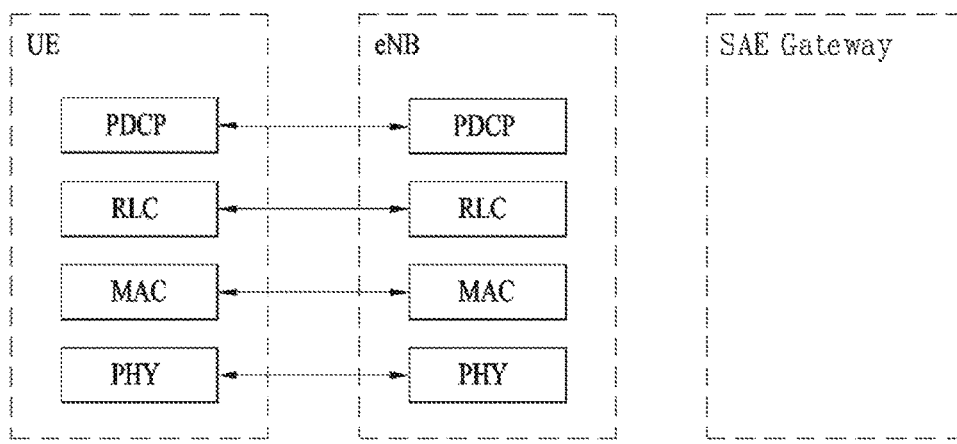
(b) USER-PLANE PROTOCOL STACK (a) in coverage  (b) out-of-coverage  (c) partial coverage

METHOD FOR TRANSMITTING OR RECEIVING SIGNAL IN WIRELESS COMMUNICATION SYSTEM SUPPORTING D2D COMMUNICATION AND APPARATUS FOR PERFORMING SAME

CROSS-REFERENCE TO RELATED APPLICATIONS

This application is the National Stage filing under 35 U.S.C. 371 of International Application No. PCT/KR2016/009312, filed on Aug. 23, 2016, which claims the benefit of U.S. Provisional Application No. 62/208,806, filed on Aug. 23, 2015, the contents of which are all hereby incorporated by reference herein in their entirety.

TECHNICAL FIELD

The present invention relates to a wireless communication system supporting D2D communication, and more particularly, to a method of adaptively transmitting or receiving a signal in wireless communication environment in which D2D communication is performed and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to provide a method of more efficiently and precisely transmitting and receiving a signal by adaptively changing a physical format according to wireless communication environment in a wireless communication system supporting D2D communication and an apparatus therefor.

Technical tasks obtainable from the present invention are non-limited by the above-mentioned technical task. And, other unmentioned technical tasks can be inferred from the following embodiments.

Technical Solution

In an aspect of the present invention, a method of receiving a signal by a device supporting D2D communication through a physical format adaptive to wireless communication environment, includes receiving a synchronization signal from a transmission node based on either a first physical format or a second physical format, and performing synchronization with the transmission node based on the synchronization signal. When the second physical format is used, the M synchronization symbols in addition to N synchronization symbols used in the first physical format are set in a same subframe and the total N+M synchronization symbols included in the same subframe can include a first synchronization symbol to which a first Zadoff-Chu sequence generated through first root indexes is mapped and a second synchronization symbol to which a second Zadoff-Chu sequence generated through second root indexes is mapped.

In other aspect of the present invention, a device supporting D2D communication includes a receiver to receive a synchronization signal from a transmission node based on either a first physical format or a second physical format, and a processor to perform synchronization with the transmission node based on the synchronization signal. When the second physical format is used, M synchronization symbols in addition to N synchronization symbols used in the first physical format are set in a same subframe and the total N+M synchronization symbols included in the same subframe can include a first synchronization symbol to which a first Zadoff-Chu sequence generated through first root indexes is mapped and a second synchronization symbol to which a second Zadoff-Chu sequence generated through second root indexes is mapped.

In another aspect of the present invention, a method of transmitting a signal by a device supporting D2D communication through a physical format adaptive to wireless communication environment, includes generating a synchronization signal based on either a first physical format or a second physical format, and transmitting the synchronization signal to a reception node. When the second physical format is used, M synchronization symbols in addition to N synchronization symbols used in the first physical format are set in a same subframe and the total N+M synchronization symbols included in the same subframe can include a first synchronization symbol to which a first Zadoff-Chu sequence generated through first root indexes is mapped and a second synchronization symbol to which a second Zadoff-Chu sequence generated through second root indexes is mapped.

Preferably, the first root index and the second root index, which are used in the second physical format, are configured differently from a third root index and a fourth root index used in the first physical format and a sum of the first root index and the second root index can be configured to be identical to a sum of the third root index and the fourth root index.

Preferably, if the second physical format is used, the number of demodulation reference signal (DMRS) symbols for a physical sidelink broadcast channel (PSBCH) which is transmitted in a subframe in which the synchronization signal is transmitted, can be configured to be less than a number of DMRS symbols for a different D2D channel More preferably, a difference between the number of DMRS symbols for the PSBCH and the number of DMRS symbols for the different D2D channel may correspond to 'N+M' which is the total number of the synchronization symbols.

Preferably, the second physical format is used for a frequency band higher than a frequency band used by the first physical format or the second physical format can be used when latency shorter than latency by the first physical format is required.

More preferably, a number of symbols constructing transmission time interval (TTI) of the first physical format can be configured as an integer multiple of a number of symbols constructing TTI of the second physical format.

Preferably, information on a physical format to be used among the first physical format and the second physical format can be received from the transmission node.

Advantageous Effects

According to one embodiment of the present invention, since a physical format is adaptively changed according to wireless communication environment in which D2D communication is performed, it is able to transmit and receive a signal robust to performance degradation due to the increase of frequency offset or the requirement of low latency.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a UE and an E-UTRAN based on the 3GPP radio access network specification;

MODE FOR INVENTION

Figure 1:
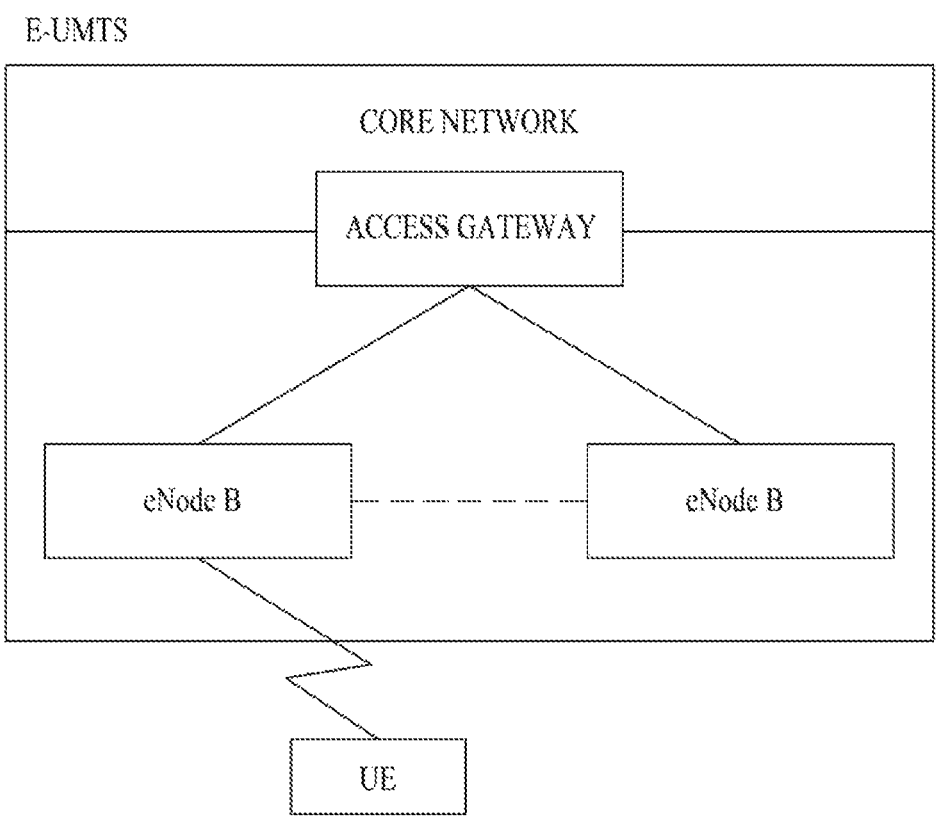
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel The physical layer is connected to a media access control (MAC) layer of an upper layer via a transmission channel. Data is transmitted between the MAC layer and the physical layer via the transmission channel Data is also transmitted between a physical layer of a transmitter and a physical layer of a receiver via a physical channel The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
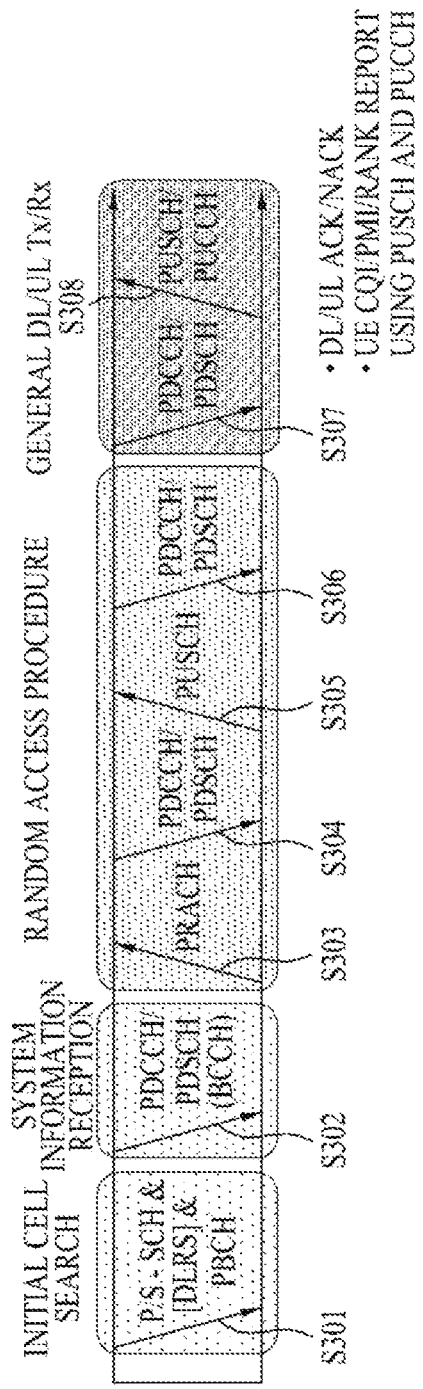
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
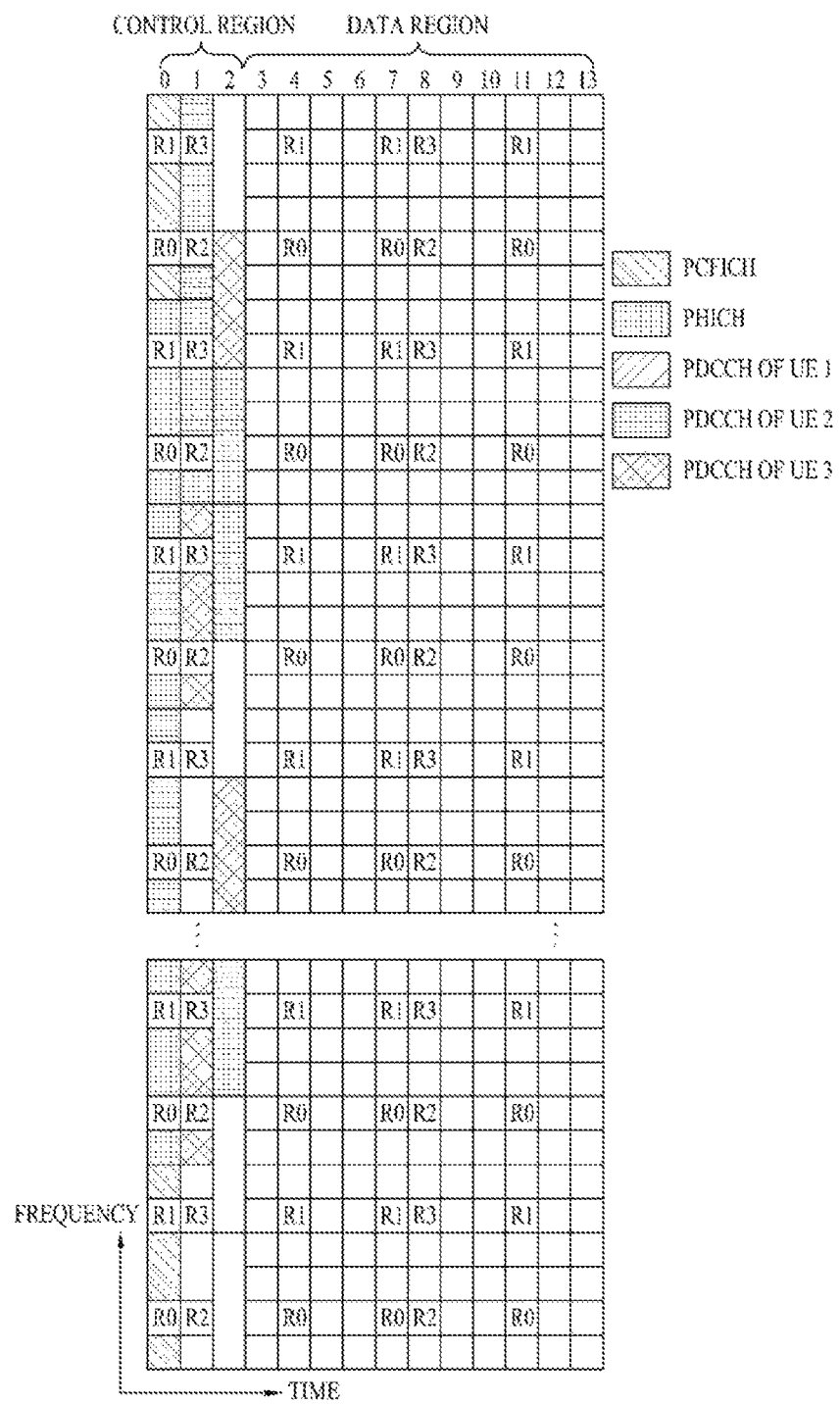
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
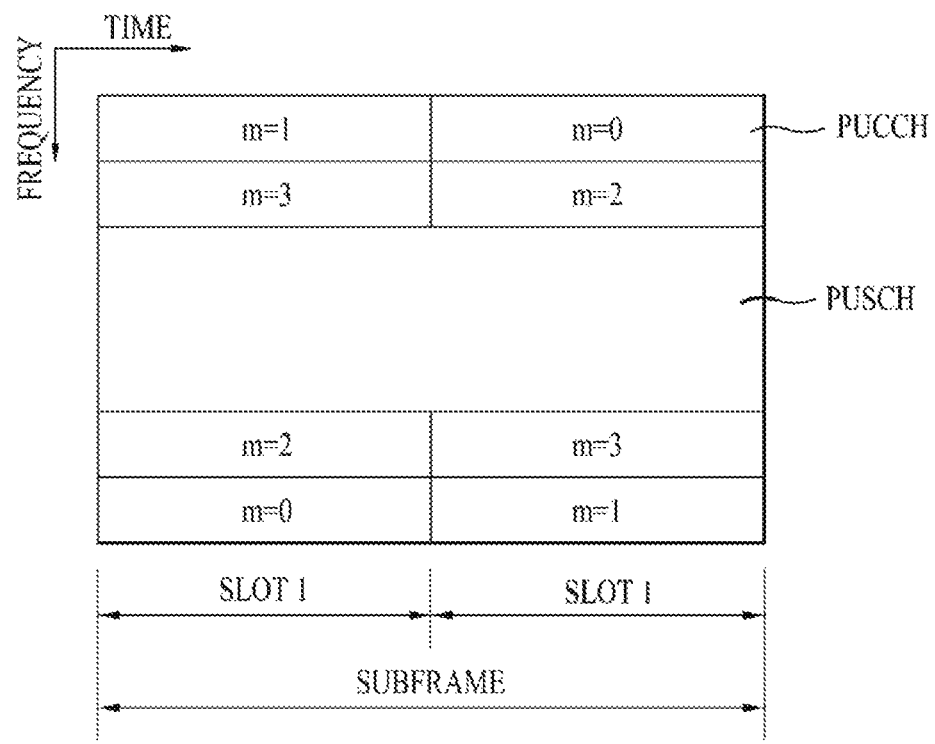
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
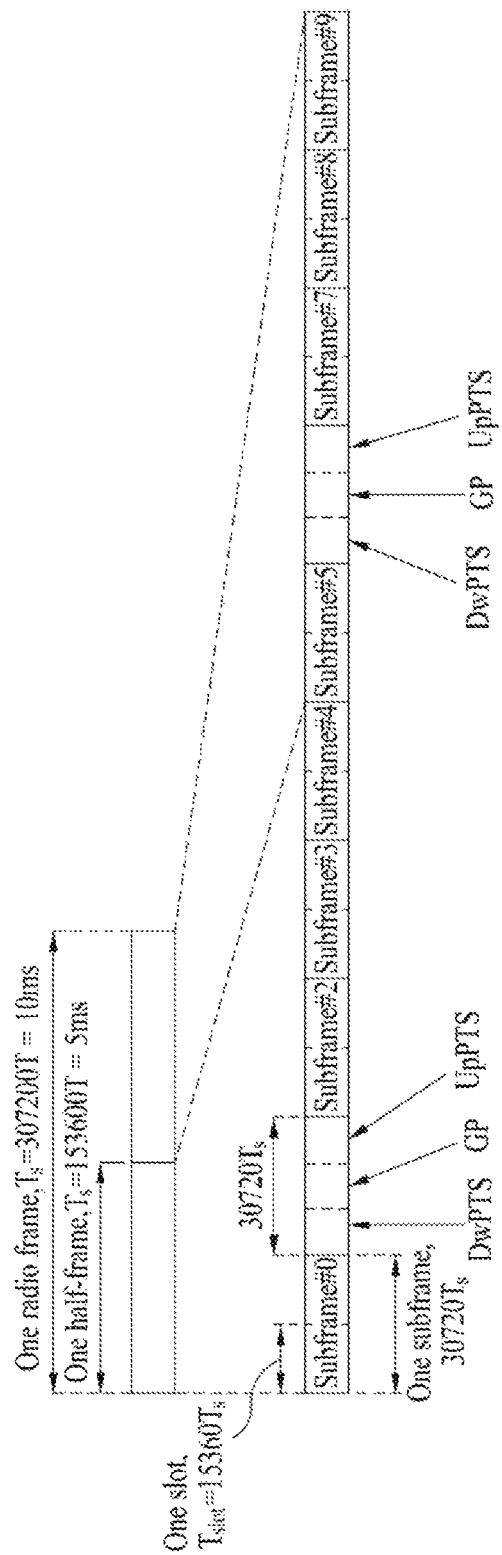
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
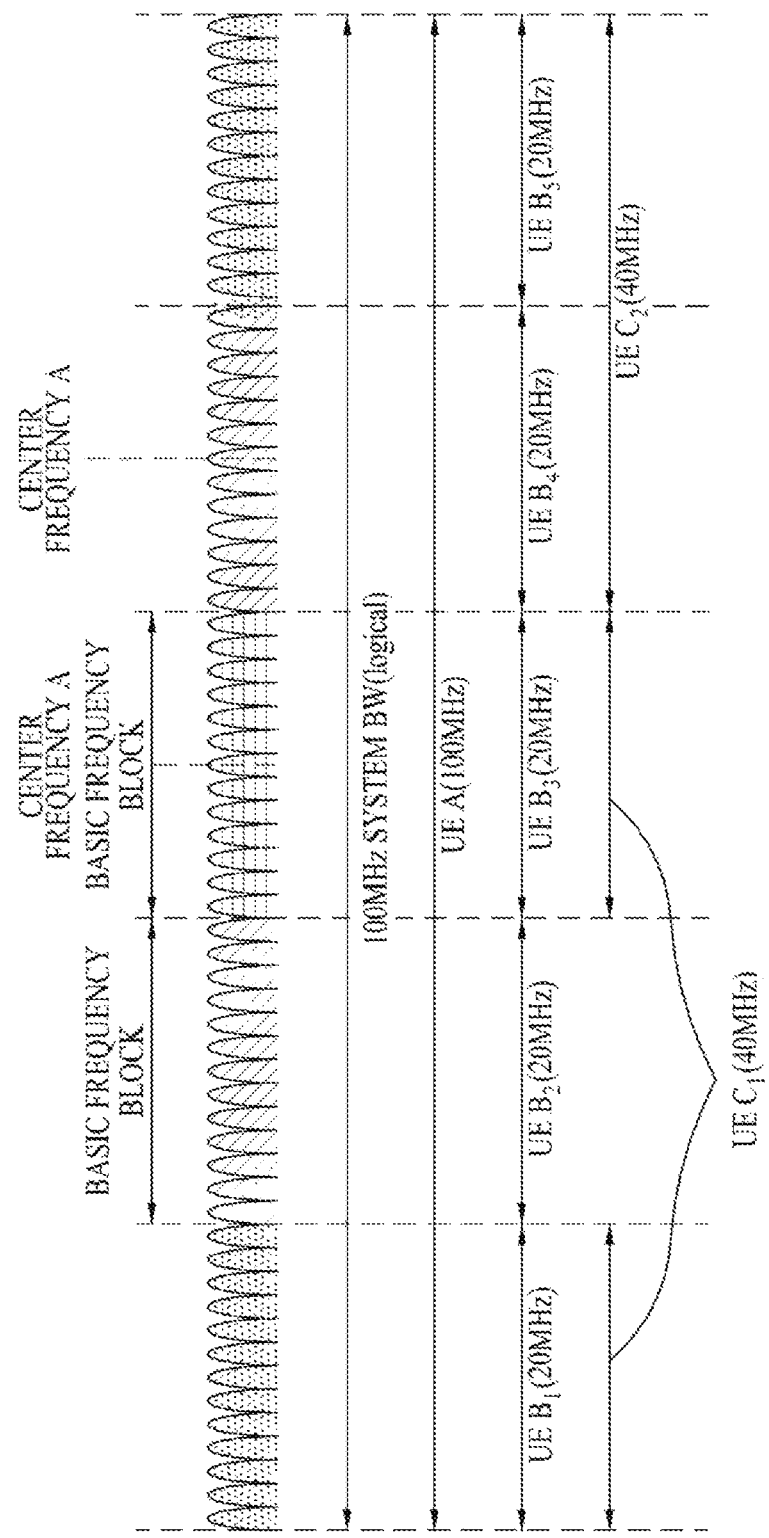
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
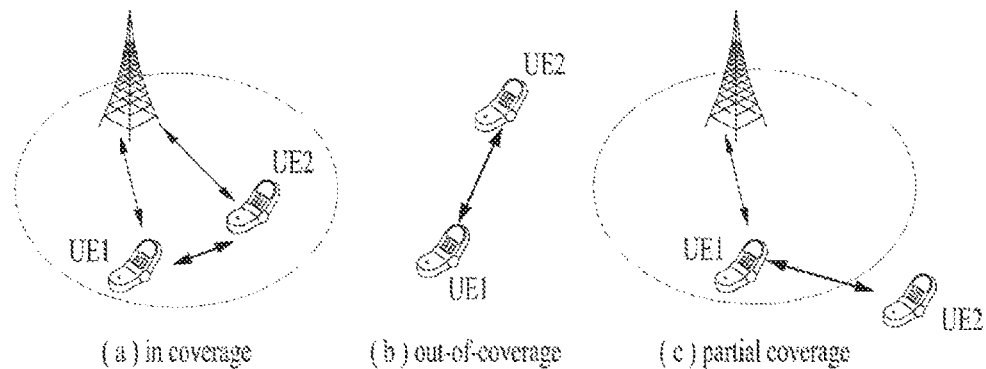
FIG. 8 is a diagram illustrating exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 MHz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \text{ [dBm]} \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min\left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \text{ [dBm]} \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$, $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} \text{ [dBm]}$$ [Equation 3]

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ maximum transmission power of a UE, $P_{0\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_PUCCH}$ is changed in the higher layer and g(0)=$\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \quad \text{[Equation 4]}$$
$$\min\left\{ \begin{array}{l} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array} \right\} \text{ [dBm]}$$

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values α according to Equation 1.

$$\alpha = 2\pi \frac{n_{SRS}^{cs}}{8} \quad \text{[Equation 5]}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, 1) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 6]}$$

where, $k_0$ denotes a frequency domain start point of an SRS and is defined by Equation 7.

$$k_0 = k_0' + \sum_{b=0}^{B_{SRS}} 2M_{sc,b}^{RS} n_b \quad \text{[Equation 7]}$$

where, $n_b$ denotes a frequency location index. $k'_0$ for a general uplink subframe is defined by Equation 8 and $k'_0$ for an uplink pilot time is defined by Equation 9.

$$k_0' = (\lfloor N_{RB}^{UL}/2 \rfloor - m_{SRS,0}/2)N_{SC}^{RB} + k_{TC} \quad \text{[Equation 8]}$$

$$k_0' = \begin{cases} (N_{RB}^{UL} - m_{SRS,0}^{max})N_{sc}^{RB} + k_{TC} & \text{if}((n_f \bmod 2) \times (2 - \\ & N_{SP}) + n_{hf}) \bmod 2 = 0 \\ k_{TC} & \text{otherwise} \end{cases} \quad \text{[Equation 9]}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \quad \text{[Equation 10]}$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b \quad \text{[Equation 11]}$$

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 12]}$$

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \\ \qquad \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Equation 13]}$$

where, $n_{SRS}$ is a parameter used to calculate the number of times of transmitting the SRS and is defined by Equation 14.

$$n_{SRS} = \qquad \text{[Equation 14]}$$

$$\begin{cases} 2N_{SP}n_f + \\ 2(N_{SP}-1)\left\lfloor \dfrac{n_s}{10} \right\rfloor + & for\,2ms\,SRS\,periodicity\,of\,TDD\,frame\,structure \\ \left\lfloor \dfrac{T_{offset}}{T_{offset\_max}} \right\rfloor, \\ \lfloor (n_f \times 10 + \\ \lfloor n_s/2 \rfloor)/T_{SRS} \rfloor, & otherwise \end{cases}$$

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS}>2$). Yet, in Equation 15, $k_{SRS}$ corresponds to $\{0, 1, \ldots, 9\}$ in case of the FDD system, whereas $k_{SRS}$ is determined according to Table 9 in the following in case of the TDD system.

$$(10 \cdot n_f + k_{SRS} - T_{offset}) \bmod T_{SRS} = 0 \qquad \text{[Equation 15]}$$

TABLE 9

| | subframe index n | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | | 0 | 1 | 2 | 3 | 4 | | 5 | 6 | 7 | 8 | 9 |
| $k_{SRS}$ in case UpPTS length of 1 symbol | 1 | | | 2 | 3 | 4 | | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0 \qquad \text{[Equation 16]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

TABLE 11

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS}>2$) in the Table 11. Equation 18 in the following is used for a TDD system of which $T_{SRS}$ is equal to 2 ($T_{SRS}=2$) in the Table 11. Yet, in case of the FDD system, $k_{SRS}$ corresponds to {0, 1, ..., 9}. In case of the TDD system, $k_{SRS}$ is determined according to the Table 9.

$$(10 \cdot n_f + k_{SRS} - T_{offset,1}) \bmod T_{SRS,1} = 0 \qquad \text{[Equation 17]}$$

$$(k_{SRS} - T_{offset,1}) \bmod 5 = 0 \qquad \text{[Equation 18]}$$

Synchronization Signal

In LTE/LTE-A system, a PSS (primary synchronization signal) and an SSS (secondary synchronization signal) are used to perform cell search. Cell search is explained first before the PSS and the SSS are explained. The cell search is performed when a UE firstly accesses a cell, performs handover to a different cell from a currently accessed cell, or reselects a cell. The cell search can be performed by obtaining frequency and symbol synchronization for a cell, obtaining downlink frame synchronization of a cell, and determining a cell identifier ($N_{ID}^{Cell}$). A cell group consists of 3 cell identifiers and there may exist 168 cell groups.

For the cell search, a base station transmits a PSS and an SSS. A UE obtains 5 ms timing of a cell by detecting the PSS and is able to know an identifier of the cell belonging to a cell group. And, the UE is able to know radio frame timing and a cell group by detecting the SSS.

The PSS is transmitted in $0^{th}$ and $5^{th}$ subframes. More specifically, the PSS is transmitted in the last OFDM symbol of a first slot of the $0^{th}$ and the $5^{th}$ subframes. And, the SSS is transmitted in an OFDM symbol immediately before the last OFDM symbol of the first slot of the $0^{th}$ and the $5^{th}$ subframes. In particular, the SSS is transmitted in the OFDM symbol immediately before the OFDM symbol in which the PSS is transmitted. The abovementioned transmission timing is applied to a FDD case. In case of TDD, the PSS is transmitted in a third symbol (i.e., DwPTS) of a $1^{st}$ and a $6^{th}$ subframes and the SSS is transmitted in the last symbol of a $0^{th}$ and $5^{th}$ subframes. In particular, in TDD, the SSS is transmitted in a symbol preceding a symbol in which the PSS is transmitted as many as 3 symbols.

The PSS corresponds to a Zadoff-Chu sequence of a length of 63. When the PSS is actually transmitted, 0 s are padded to both ends of the sequence. The sequence is transmitted on 73 subcarriers (72 subcarriers (i.e., 6 RBs) except a DC subcarrier) positioned at the center of a system frequency bandwidth. The SSS corresponds to a sequence of a length 62 made by performing frequency interleaving on two sequences of a length of 31. Similar to the PSS, the SSS is transmitted on 72 subcarriers positioned at the center of the entire system bandwidth.

In LTE/LTE-A, a sequence of a PSS transmitted by a base station can be generated by equation 19 described in the following.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \qquad \text{[Equation 19]}$$

In equation 19, u corresponds to a root index of a Zadoff-Chu sequence. The root index u is selected from among {25, 29, 34}. A physical cell ID ($N_{ID}^{Cell}$) is generated based on a selected value. More specifically, the physical cell ID ($N_{ID}^{Cell}$) is given by $3N_{ID}^{(1)} + N_{ID}^{(2)}$. $N_{ID}^{(1)}$ corresponds to a number selected from among 0 to 167 derived from an SSS sequence and $N_{ID}^{(2)}$ corresponds to a number selected from among 0 to 2 derived from a PSS sequence. $N_{ID}^{(2)}=0$, 1, and 2 correspond to root indexes {25, 29, 34}, respectively.

A set {25, 29, 34} of root indexes used for generating the PSS is selected in consideration of PAPR (Peak-to-Average Power Ratio), Cubic metric, frequency offset sensitivity, and the like. Among the root indexes, 29 and 34 have root symmetry property in time domain due to the characteristic of the Zadoff-Chu sequence. Hence, each value of sequences generated by the root indexes 29 and 34 has a complex conjugate form at the same position. In particular, a pair of root indexes of which the sum of root indexes is identical to a length of a Zadoff-Chu sequence has a characteristic of complex conjugate. Hence, although one root index among a pair of the root indexes is used, since it is able to detect a sequence generated through another root index, it is able to reduce correlator complexity of a receiver.

D2D (Device to Device) Communication

In the following, D2D communication based on LTE system is explained. D2D can be referred to as direct communication between UEs or a sidelink In general, a UE corresponds to a terminal of a user. If such a network device as an eNB transmits and receives a signal according to a D2D communication scheme, the network device can also be considered as a UE as well.

FIG. 8 is a diagram illustrating exemplary scenarios of D2D communication. D2D resources can be allocated from a UL resource (e.g., In case of FDD, a UL frequency resource. In case of TDD, a UL subframe). (a) In case of in-coverage D2D communication, a network controls D2D resources used for D2D communication. The network may allocate a specific resource to a transmission UE or may allocate a pool of D2D resources capable of being selected by a UE. (b) In case of out-of-coverage D2D communication, since a network is unable to directly control a D2D resource, a UE uses a preconfigured D2D resource. (c) In case of partial coverage D2D communication, a UE, which is located at the outside of the coverage, is able to use preconfigured parameters. On the contrary, a UE, which is located within the coverage, is able to use a D2D resource obtained from the network.

For clarity, assume that a UE1 selects a resource unit (RU) corresponding to a specific D2D resource from a resource pool and the UE1 transmits a D2D signal using the selected RS. A resource pool corresponds to a set of D2D resources. Assume that a UE2 corresponding to a reception UE receives information on a resource pool in which the UE1 is able to transmit a signal and detects a signal of the UE1 in the resource pool. In this case, if the UE1 is located within a connection range of an eNB, the eNB can inform the UE1 of information on the resource pool. If the UE1 is located at the outside of the connection range of the eNB, the resource pool can be informed by a different UE or can be determined by a predetermined resource. In general, a resource pool includes a plurality of RUs. A UE selects one or more RUs and may be able to use the selected RUs for transmitting a D2D signal of the UE.

Figure 9:
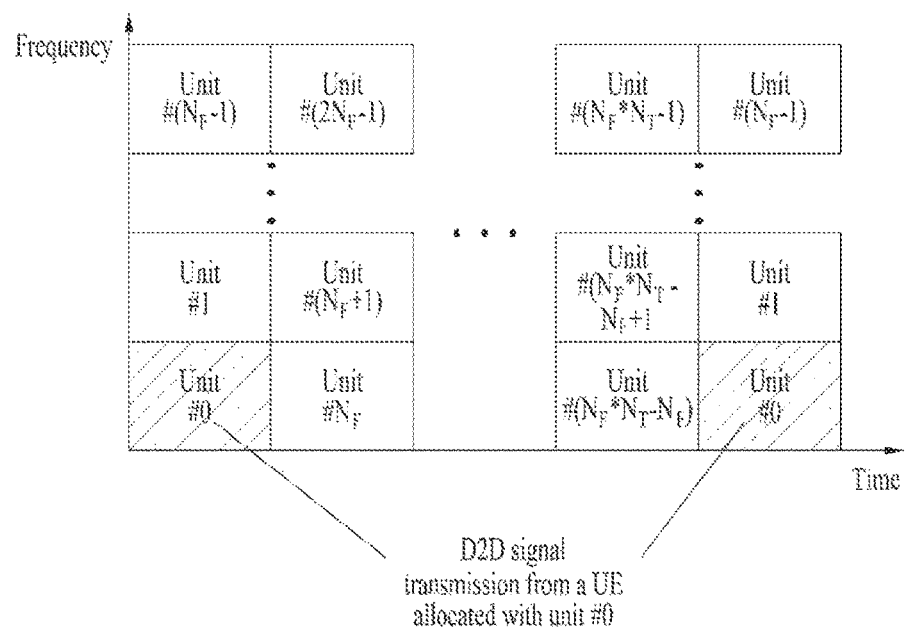
FIG. 9 is a diagram illustrating an example of a D2D RU.

FIG. 9 is a diagram illustrating an example of a D2D RU. For clarity, assume that the entire frequency resources are divided into the $N_F$ number of resource units and the entire time resources are divided into the $N_T$ number of resource units.

In FIG. 9, a resource pool can be repeated with a period of $N_T$ subframes. For example, as shown in FIG. 9, one resource unit may periodically and repeatedly appear.

Or, an index of a physical RU to which a logical RU is mapped may change based on a predetermined pattern over time to obtain a diversity gain in time domain and/or frequency domain. In this RU structure, a resource pool may correspond to a set of resource units capable of being used by a UE intending to transmit a D2D signal.

The aforementioned resource pool can be classified into various types. For example, the resource pool can be classified according to contents of a D2D signal transmitted via each resource pool. For example, the contents of the D2D signal can be classified as follows and a separate resource pool can be configured according to contents of each D2D signal.

Scheduling assignment (SA): The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical RU in a manner of being multiplexed with D2D data. In this case, an SA resource pool may correspond to a pool of resources that an SA and D2D data are transmitted in a manner of being multiplexed. The SA can be referred to as an SCI (side link control channel) and can be transmitted via a D2D control channel (e.g., PSCCH).

D2D data channel: The D2D data channel corresponds to a channel for transmitting user data scheduled by the SA. It may be able to configure a pool of resources for the D2D data channel.

Discovery channel: The discovery channel corresponds to a channel for transmitting a discovery signal including information on an ID of a transmission UE, and the like to enable a neighboring UE to discover the transmission UE. It may be able to configure a resource pool for the discovery channel.

Meanwhile, although contents of D2D signal are identical to each other, it may use a different resource pool according to a transmission/reception attribute of the D2D signal. For example, in case of a D2D data channel of the same type or a discovery channel of the same type, the D2D data channel or the discovery channel can be transmitted in a different resource pool in consideration of (i) a transmission timing determination scheme of a D2D signal (e.g., whether a D2D signal is transmitted at the time of receiving a synchronization reference signal or the timing to which a prescribed timing advance is added), (ii) a resource allocation scheme (e.g., whether a transmission resource of an individual D2D signal is designated by an eNB or a transmission UE autonomously selects a D2D signal transmission resource from a resource pool), (iii) a signal format (e.g., number of symbols occupied by a D2D signal in a subframe, number of subframes used for transmitting a D2D signal), (iv) signal strength from an eNB, (v) strength of transmit power of a D2D UE, and the like.

As mentioned in the foregoing description, such a term as 'D2D' can also be referred to as 'SL (side link)' and 'SA' can also be referred to as PSSCH (physical sidelink control channel). A D2D synchronization signal can be referred to as an SSS (sidelink synchronization signal) and the SSS can be transmitted via a physical sidelink broadcast channel (PSBCH). The PSBCH transmits most basic information (e.g., system information such as SL-MIB, etc.) prior to D2D communication and can also be referred to as a PD2DSCH (physical D2D synchronization channel). A UE transmits a signal (e.g., a discovery signal including an ID of the UE) to a neighboring UE using a discovery channel to inform the neighboring UE of the existence of the UE. The discovery channel is referred to as a PSDCH (physical sidelink discovery channel).

D2D communication of a narrow sense can be distinguished from D2D discovery. For example, if only a UE performing the D2D communication of a narrow sense transmits PSBCH together with SSS (except a UE performing D2D discovery), the SSS can be measured using a DMRS of the PSBCH. An out-of-coverage UE measures the DMRS of the PSBCH (e.g., RSRP, etc.) and may be then able to determine whether or not the UE becomes a synchronization source based on a measurement result.

Figure 10:
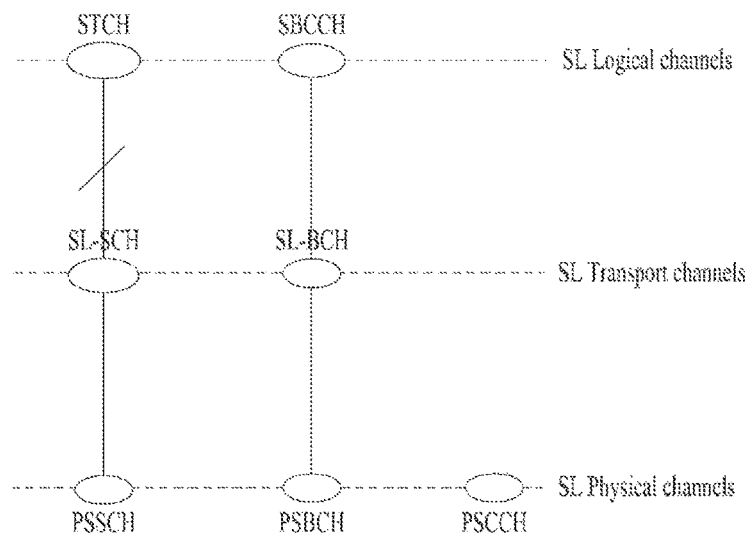
FIG. 10 is a diagram illustrating SL (side link) channels.

FIG. 10 is a diagram illustrating SL (side link) channels. The SL channels shown in FIG. 9 may correspond to channels for performing D2D communication (e.g., D2D communication of a narrow sense).

Referring to FIG. 10, STCH (SL traffic channel) and SBCCH (SL broadcast control channel) correspond to logical channels. The STCH transmits user data received from an application and is connected with SL-SCH (SL shared channel). The SL-SCH corresponding to a transport channel is connected with PSSCH (physical SL shared channel). The SC-SCH signals information necessary for performing synchronization in out-of-coverage or partial coverage scenario or information necessary for performing synchronization between UEs belonging to a different cell. The SBCCH is connected with SL-BCH corresponding to a transport channel. The SC-BCH is connected with PSBCH.

PSCCH (physical SL control channel) performs a role similar to a role of PDCCH in legacy communication performed between a UE and an eNB. The PSCCH is used to transmit SA (scheduling assignment). The SA can also be referred to as SCI (sidelink control information).

For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

For example, in the mode 1, an eNB designates a resource to be used for D2D communication in a resource pool. In the mode 2, a UE selects a resource pool from a set of allocated resource pools and may be able to directly select a D2D resource to be used from the selected resource pool. Hence, it is necessary for the UE to be in an RRC connected state in the mode 1. On the contrary, the UE may be in an RRC idle state or an out-of-coverage state in the mode 2.

Figure 11:
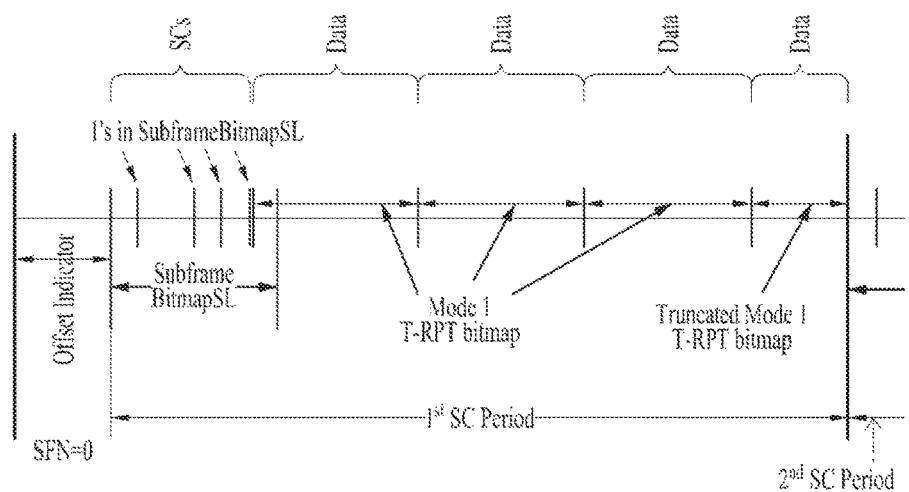
FIG. 11 is a diagram illustrating a D2D communication mode 1.

FIG. 11 is a diagram illustrating a D2D communication mode 1. According to a PSSCH/PSSCH structure for performing D2D communication, a set of subframes (i.e., a subframe bitmap) is divided into two regions (e.g., a control region and a data region). Whether or not a subframe is usable for D2D communication can be indicated via a subframe bitmap.

Referring to FIG. 11, an SC period (SL control period) starts from an offset of SFN=0 and can be periodically repeated. The SC period starts from a control region including SCI transmitted by PSCCH and 'SubframeBitmapSL' corresponding to a higher layer parameter indicates a subframe in which PSCCH is transmitted. A data region starts after the last bit configured by 1 in the 'SubframeBitmapSL'. The data region corresponds to a T-RPT bitmap corresponding to a different bitmap. The T-RPT bitmap indicates subframes in which data is transmitted. As shown in FIG. 11, a subframe pattern indicated by the T-RPT bitmap is repeated until the SC period ends. The last T-RPT bitmap is truncated according to the end of the SC-period. The T-RPT bitmap can be dynamically configured and can be differently configured according to each SC-period and each UE.

In most part, the mode 2 operates in a manner of being similar to the mode 1 shown in FIG. 11. Yet, there is a difference between the mode 1 and the mode 2 in that a start point of a data region is not determined based on SubframeBitmapSL in the mode 2. In the mode 2, the start point of the data region has a fixed offset from a start point of an SC period.

Physical Format Configurability for D2D Communication

The aforementioned D2D communication is not restricted to communication between UEs. The D2D communication can include V2V (vehicle-to-vehicle), V2I (vehicle-to-infra.), and V2P (vehicle-to-personal) according to a type of a device and the like. In a broad sense, communication between an eNB and a UE and communication between a relay and a UE may belong to the scope of the D2D communication. Since it is able to define communication between various devices in D2D, it may also be able to define various environments in which the D2D communication is performed. For example, in case of the V2V, it is necessary for V2V communication to be smoothly operated not only in a chronically congested section but also in a fast moving section.

In the following, the present invention proposes to introduce configurability for a physical format of D2D communication to make the D2D communication to be smoothly operated in various communication environments. In particular, methods of adaptively configuring or reconfiguring a physical format used in the D2D communication according to communication environment are explained in the following.

The D2D communication may be more vulnerable to frequency offset compared to a general cellular communication.

First of all, frequency offset in a legacy cellular communication is explained. In a legacy cellular communication (e.g., 3GPP LTE system), it is required for a UE to maintain a frequency offset within 0.1 ppm with a serving cell. For example, if the serving cell uses 2 GHz frequency, a frequency offset within 200 Hz (i.e., 2 GHz*0.1 ppm) is allowed between an eNB and a UE.

Yet, when D2D communication is performed between two UEs satisfying the requirement (i.e., 0.1 ppm) of the cellular communication, a frequency offset as much as maximum 0.2 ppm (i.e., 0.1+0.1 ppm) may occur. In particular, if the frequency offset increases and an operation frequency is high, performance of the D2D communication can be degraded. In particular, as the operation frequency is higher, performance degradation according to the frequency offset is increasing.

And, in case of the V2V where a device moves fast, Doppler Effect occurs due to the speed of a vehicle and an additional frequency offset may occur due to the Doppler Effect. For example, a frequency offset may occur up to maximum 1.18 kHz between two vehicles using 5.9 GHz frequency on a congested road. And, an additional frequency offset as much as 1.420 kHz may occur between two vehicles moving fast (e.g., 130 km/h) due to the Doppler Effect. In this case, it is assumed that a synchronization reference between the two vehicles is the same (e.g., the two vehicles are synchronized with the same node). If the synchronization reference is different, an additional frequency offset may further occur. Consequently, in case of the V2V under the assumption of fast moving, a frequency offset as much as 2.6 kHz (i.e., 1.18 kHz+1.42 kHz) may occur. This means that each subcarrier frequency is received in a manner of being dislocated more than 10%. In particular, if a frequency offset is big and there is no compensation for the frequency offset, performance can be considerably degraded.

As a method of compensating for a frequency offset, it may consider a method of increasing the number of RS symbols.

Figure 12:
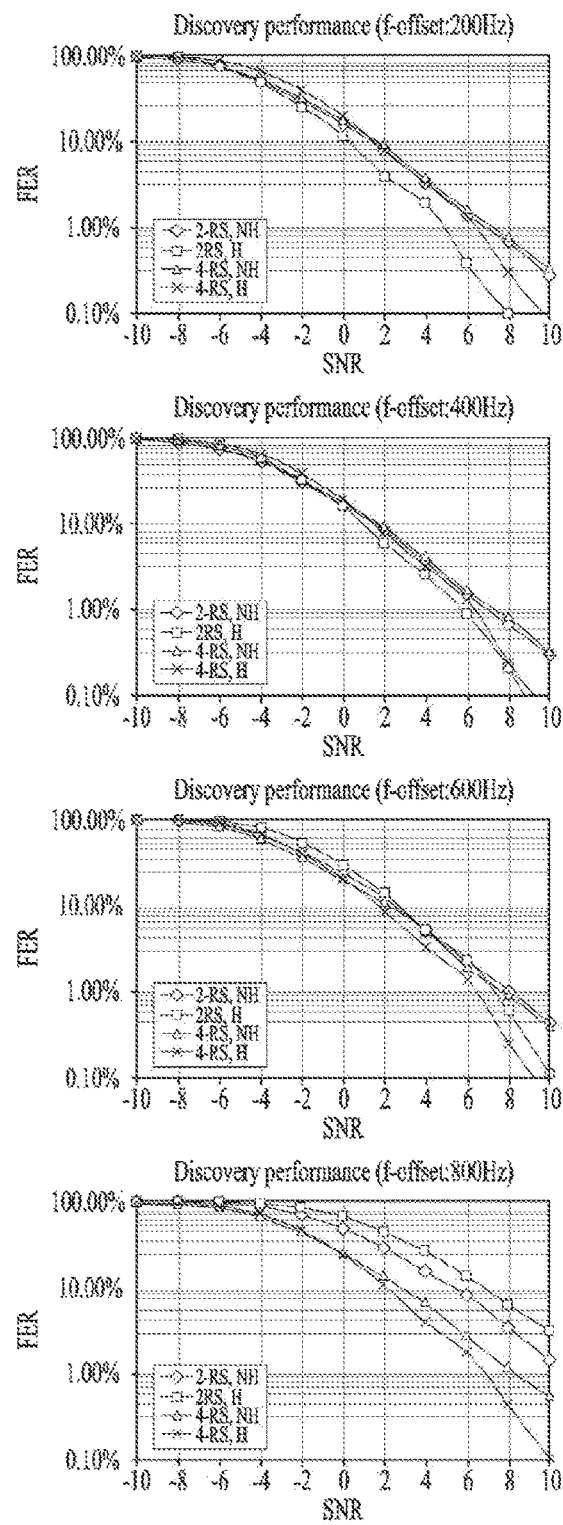
FIG. 12 is a diagram illustrating demodulation performance according to an RS pattern in each frequency offset.

FIG. 12 is a diagram illustrating demodulation performance according to an RS pattern in each frequency offset.

In the simulation shown in FIG. 12, 2RS NH (2 RS symbols non-hopping), 4RS NH (4 RS symbols non-hopping), and 4RS H (4 RS symbols hopping) cases assume channel estimation using linear interpolation. In case of 2 RS H (2 RS symbols hopping), since one RS symbol exists only in one slot, a slot average scheme is used to perform channel estimation.

In case of using the linear interpolation, since channel estimation is performed on symbols near an RS in a manner of linearly connecting channel coefficients estimated by RSs of a different symbol of the same subcarrier, it is able to compensate for a frequency offset.

As shown in FIG. 12, slot hopping capable of obtaining an overall diversity gain shows good performance. If a frequency offset is low, a 2RS pattern of which a coding rate is relatively low shows better performance compared to a 4RS pattern. On the contrary, if a frequency offset is equal to or greater than 600 Hz, the 4RS pattern capable of compensating for the frequency offset shows good performance. If a frequency offset is 800 Hz, it may have a result that performance of 2RS H is lower than performance of 2RS NH.

According to the result, if a frequency offset is equal to or greater than a certain level, frequency offset compensation capability plays a more important role compared to a coding rate and a diversity gain by hopping.

According to embodiments of the present invention, it may use a different physical layer format or perform a different procedure according to a type of a device or a service of D2D communication. For example, when a great amount of data are transmitted and received in a state that a device is stopped and when a less amount of data are transmitted and received in a state that the device moves fast, a physical format/procedure of D2D communication may vary.

For example, when a huge amount of data is transmitted in a state that a device is stopped, it may use a D2D format (e.g., 2 DMRS symbols are configured in a subframe. In case of D2D communication, SA (scheduling assignment) is received and then data are received in a resource indicated by the SA) currently defined in LTE system. Yet, if the device moves fast, it may be preferable for the device to receive data in the same subframe in a manner of multiplexing the data with control information (i.e., SA).

In particular, it is necessary for D2D communication to adaptively operate according to various wireless channel environments. To this end, methods of changing the frequency offset, the physical format, and the procedure according to wireless channel environment (e.g., mobility, carrier frequency, a service type, etc.) are proposed in the following.

A resource to which the proposed physical format and the proposed content are applied can be defined in advance or can be forwarded to each device via higher layer signaling. For example, an eNB can signal a physical format and the like used in D2D communication via SIB, or the like. An in-coverage device and/or an out-of-coverage device, which has configured the in-coverage device as a synchronization reference, can perform communication based on D2D physical format signaling within SIB. For example, the out-of-coverage device, which has configured the in-coverage device as a synchronization reference, can receive D2D physical format signaling within SIB from the synchronization reference. The SIB including D2D physical format information can be transmitted on PSBCH, or the like, by which the present invention may be non-limited.

If the out-of-coverage device fails to detect synchronization disseminated by a network, the out-of-coverage device can perform D2D communication based on a predefined physical format (e.g., a format defined for the out-of-coverage device).

As a different method, a physical format to be used in specific environment (e.g., fast moving environment) can be defined in advance without signaling. For example, a predefined physical format can be used for a specific service type, a specific carrier frequency, and/or a specific resource pool.

A resource to which a physical format described in the following is applied can be included in the signaling proposed in the foregoing description. The resource can be signaled in a unit described in the following.

●Configuration Unit of Physical Format (1) D2D Channel

It may be able to configure a D2D channel to which a physical format is applied. For example, a physical format can be applied in a unit of a D2D channel. PSBCH can be transmitted in a subframe in which a D2D synchronization signal is transmitted. In case of the PSBCH, when a reception device performs channel estimation to demodulate the PSBCH, the reception device may use a D2D synchronization signal transmitted in a subframe in which the PSBCH is transmitted. In particular, when the D2D synchronization signal and the PSBCH are transmitted in the same subframe, the number of symbols of a DMRS can be configured to be less compared to a different channel (a channel transmitted in a subframe different from a subframe in which a synchronization signal is transmitted). For example, a DMRS of 2 symbols is set to the PSBCH and a DMRS of 4 symbols can be set to a different channel such as PSSCH/PSDCH.

(2) Resource Pool

A plurality of resource pools can be defined for D2D discovery, D2D communication, and the like. Physical formats described in the following can be differently or independently configured according to each of a plurality of the resource pools.

(3) Carrier Frequency

When a plurality of carriers are configured for D2D communication, a physical format can be differently or independently configured according to each of a plurality of the carriers. A physical format differently configured in a unit of a specific frequency can be extensively applied to an operating band defined in LTE standard. For example, a different physical format can be configured according to an operating band defined in 3GPP TS 36.101.

(4) Service Type/D2D Device Type

It may be able to define a different physical format according to a service type of D2D communication and/or a device type of D2D communication. For example, In case of V2V, since it is highly probable to have fast moving environment, it may be able to configure a physical format robust to a frequency offset, and the like.

●Configuration Item of Physical Format

In the following, items of a physical format/procedure capable of being changed according to a situation in D2D communication are explained. A single item or a combination of the items described in the following can be signaled to a D2D device.

(1) Physical Format for Reference Signal

The number of RS symbols transmitted in a subframe can be signaled to a D2D device. In environment where a frequency offset is big, if the number of RS symbols increases, performance of D2D communication can be enhanced.

A position of a symbol in which an RS is transmitted can be signaled as well. A position of an RS symbol is defined in advance in a pattern form and an index of the pattern can be signaled to a D2D device. For example, when it is not necessary to have time for AGC (automatic gain control) and/or when it is not necessary to have time for switching with cellular communication, if RSs are transmitted in the first symbol and the last symbol of a subframe, it may be able to enhance channel estimation performance For example, a reception device can perform channel estimation on symbols located at the center of a subframe by performing interpolation based on the RSs transmitted in the first symbol and the last symbol. On the contrary, if the AGC is performed or it is necessary to have time for switching and the like, it may transmit and receive an RS in a symbol except the symbols.

It may also signal a type of an RS. For example, if an RS defined in legacy cellular communication is reused in D2D, it may signal a type of an RS to be used for the D2D communication among previously defined RSs such as a DL CRS, a DL DLRS, a UL DMRS, and/or a UL SRS. For example, an SRS, which is transmitted based on a transmission comb, can be reused as an RS of a D2D usage in the aforementioned high carrier frequency and fast moving situation. By doing so, it is able to effectively suppress ICI and the like occurred due to a frequency offset and the like.

Or, one or a plurality of RSs can be newly defined for D2D and it may signal a newly defined RS type.

(2) Physical Format for Synchronization Signal

A synchronization procedure should properly operate in environment having a frequency offset greater than that of general D2D communication which is performed after the synchronization procedure. To this end, it may be able to configure the number of symbols used for transmitting each synchronization signal (e.g., PSS/SSS). For example, a PSS of 2 symbols and an SSS of 2 symbols are used in specific environment and a PSS of 4 symbols and an SSS of 4 symbols can be used in another environment.

In addition, performance of detecting a PSS can be enhanced by a combination of root indexes used for generating a signal. Hence, a combination of root indexes used for generating a synchronization signal can also be signaled to a D2D device. For example, a sequence generated by the same root index can be used in each symbol in environment where a general frequency offset is anticipated. On the contrary, if a frequency offset is big, a different sequence generated by a different root index can be mapped to each of symbols.

It may indicate to use a synchronization signal sequence generated by a different root index according to the aforementioned resource unit (e.g., configuration unit of a physical format). For example, it may indicate to use a synchronization signal generated by a root index 26/37 in 2 GHz band (e.g., one of 26 and 37 is identically used for all synchronization symbols or a synchronization signal sequence generated through a different root index can be used according to each symbol.) and it may indicate to use a synchronization signal generated by a root index 29/34 in 5 GHz band.

Meanwhile, a format (e.g., the number of symbols, whether or not the same root index is used for each symbol, and a root index used according to a resource) of the aforementioned synchronization signal can be used as an implicit indication for different physical format items (e.g., RS format, frame structure, control information, multiplexing of data information, etc.).

For example, if a received synchronization signal has 2 symbols in a subframe and the same root index is used for the 2 symbols, a reception device can determine that the number of RS symbols, a frame structure, control information, whether or not data information is multiplexed, and the like are configured in a manner of being identical to a legacy LTE system. On the contrary, if a received synchronization signal has the N number of symbols in a subframe or a different root index is used for the N number of symbols, the reception device can determine that physical formats (e.g., RS format, frame structure, control information, multiplexing of data information, etc.) different from a legacy LTE system are applied.

(3) Physical Format for Frame Structure

It may be able to configure different TTI according to allowed latency. For example, it may be able to differently configure the number of symbols constructing TTI. In environment requiring low latency, one TTI can be configured by 7 symbols. On the contrary, in environment having no restriction on latency, one TTI can be configured by 14 symbols.

And, a symbol length (duration) can be configured by various values. For example, if it is assumed that a legacy symbol length corresponds to 1, it may additionally support such a symbol length as 0.5, 1, 2, and the like. If a symbol length is decreased, it can be comprehended as a bandwidth of a subcarrier increases. When the same frequency offset is assumed, it may expect robust performance compared to a case that a symbol length is long.

(4) Multiplexing of Control Information and Data

It may signal whether or not multiplexing is performed between the control information and data. For example, in environment requiring low latency, control information and data information can be transmitted in the same subframe in a manner of being multiplexed. When various schemes for multiplexing the control information and the data information in the same subframe are defined in advance, it may signal information indicating a multiplexing scheme in use among the various multiplexing schemes according to environment.

As mentioned earlier in FIG. 11, according to a general D2D communication scheme, a period for which control information (e.g., SA) is transmitted is separated from a period for which data is transmitted during 1 SC period. In this case, the control information and the data are repeatedly transmitted during its own period. In particular, the control information and the data information are not transmitted in the same subframe.

However, in environment requiring low latency, if the data is transmitted after the control information is repeatedly transmitted using the legacy scheme, a receiving end may receive the control information and fail to properly receive the data. In particular, it is unable to properly receive the data information, which is transmitted while exceeding a threshold limit value of latency.

As a method for solving the abovementioned problem, the control information and the data information can be multiplexed in one subframe. And, multiplexed data and the control information can also be repeatedly transmitted together in the subframe in which the control information is used to be repeatedly transmitted. And, if the subframe in which the data information is used to be repeatedly transmitted does not satisfy a latency requirement, transmission itself can be omitted in the subframe in which the data information is repeatedly transmitted. In particular, transmission can be omitted in a time period for which a receiving end is unable to properly perform reception.

Figure 13:
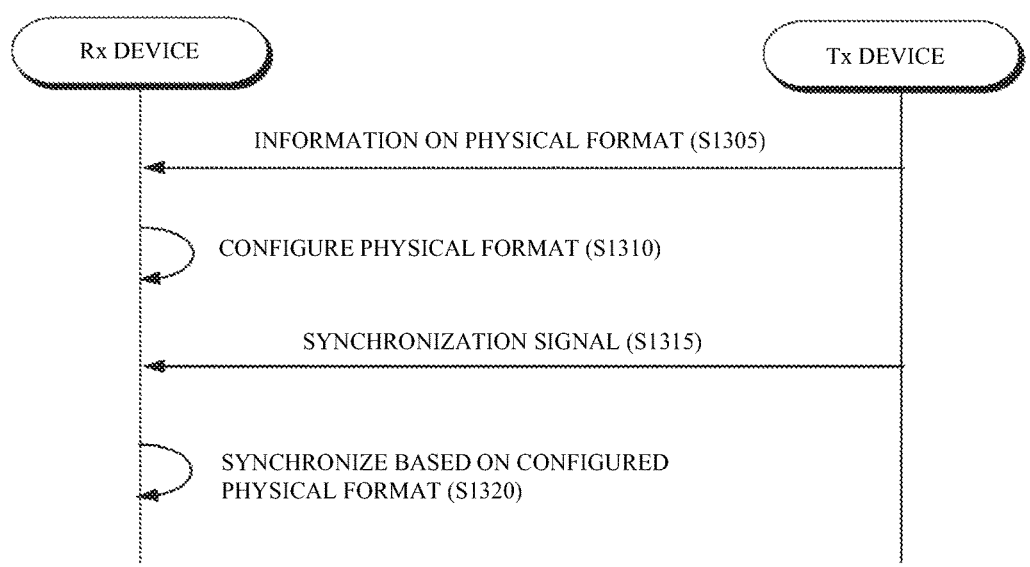
FIG. 13 is a flowchart for a method of transmitting and receiving a synchronization signal according to one embodiment of the present invention.

FIG. 13 is a flowchart for a method of transmitting and receiving a synchronization signal according to one embodiment of the present invention. Explanation on contents overlapped with the aforementioned content can be omitted.

Referring to FIG. 13, a reception device receives information on a physical format from a transmission device [S1305]. The information on the physical format may correspond to information on a physical format to be used for transmitting and receiving a signal among a first physical format and a second physical format.

The reception device can configure a necessary physical format based on the received information on the physical format [S1310]. For example, the reception device performs TTI of a changed frame structure, subcarrier spacing, and/or frequency retuning based on the received physical format and may be able to change physical layer parameters necessary for processing a signal.

The reception device receives a synchronization signal based on either the first physical format or the second physical format from the transmission device [S1315] and can perform synchronization [S1320].

When the second physical format is used, M synchronization symbols in addition to N synchronization symbols used in the first physical format can be set in a same subframe. The total N+M synchronization symbols included in the same subframe can include a first synchronization symbol to which a first Zadoff-Chu sequence generated through first root indexes is mapped and a second synchronization symbol to which a second Zadoff-Chu sequence generated through second root indexes is mapped.

A first root index and a second root index which are used in the second physical format can be configured differently from a third root index and a fourth root index used in the first physical format. Yet, the sum of the first root index and the second root index can be configured to be identical to the sum of the third root index and the fourth root index.

In case of using the second physical format, the number of demodulation reference signal (DMRS) symbols for a physical sidelink broadcast channel (PSBCH) which is transmitted in a subframe in which a synchronization signal is transmitted, can be configured to be less than the number of DMRS symbols for a different D2D channel.

And, a difference between the number of DMRS symbols for the PSBCH and the number of DMRS symbols for the different D2D channel may correspond to 'N+M' that is the total number of synchronization symbols.

And, the second physical format can be used for a higher frequency band than that of the first physical format. Or, the second physical format can be used for shorter latency than that of the first physical format.

And, the number of symbols constructing transmission time interval (TTI) of the first physical format can be configured as an integer multiple of the number of symbols constructing TTI of the second physical format.

Figure 14:
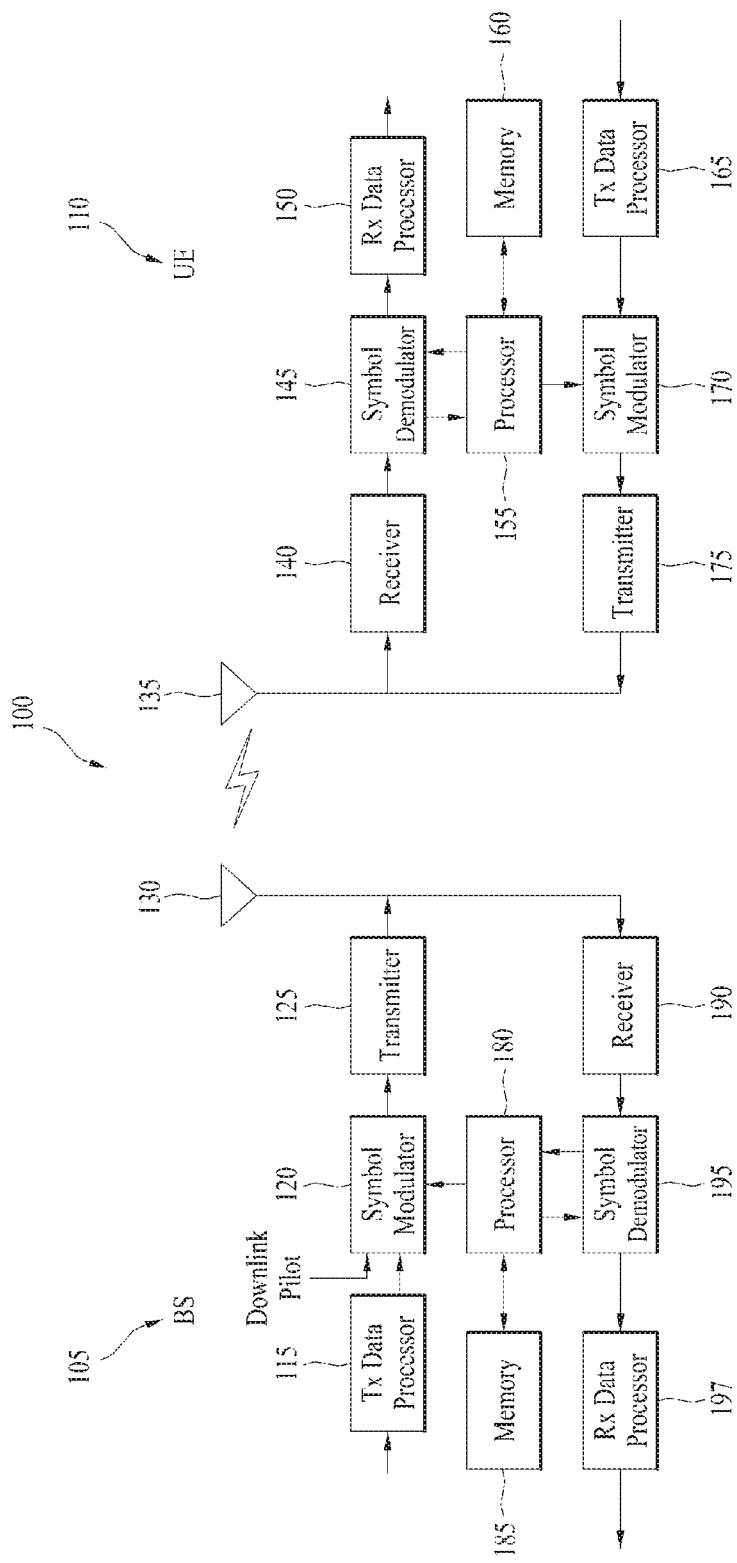
FIG. 14 is a diagram illustrating a user equipment and a base station according to one embodiment of the present invention.

FIG. 14 is a block diagram illustrating a base station (BS) 105 and a user equipment (UE) 110 for use in a wireless communication system 100 according to the present invention. The BS and the UE of FIG. 14 may perform the operations of aforementioned embodiments.

Referring to FIG. 14, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

In the present specification, although the processor 155 of the UE and the processor 180 of the BS perform an operation of processing a signal and data except a function of receiving a signal, a function of transmitting a signal, and a storing function performed by the UE 110 and the BS 105, for clarity, the processor 155/180 is not specifically mentioned in the following description. Although the processor 155/180 is not specifically mentioned, it may assume that the processor performs a series of operations such as data processing and the like rather than the function of receiving a signal, the function of transmitting a signal, and the storing function.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As mentioned in the foregoing description, the embodiments of the present invention can be applied to various wireless communication systems including 3GPP based wireless communication system.

What is claimed is:

1. A method of receiving a signal by a device supporting device to device (D2D) communication through a physical format adaptive to wireless communication environment, the method comprising:
   receiving a synchronization signal from a transmission node based on either a first physical format or a second physical format; and
   performing synchronization with the transmission node based on the synchronization signal,
   wherein when the second physical format is used, M numbers of synchronization symbols in addition to N numbers of synchronization symbols used in the first physical format are set in a same subframe and
   wherein N+M numbers of synchronization symbols contained in the same subframe comprises a first synchronization symbol to which a first Zadoff-Chu sequence generated through a first root index is mapped and a second synchronization symbol to which a second Zadoff-Chu sequence generated through a second root index is mapped, and
   wherein if the second physical format is used, a number of demodulation reference signal (DMRS) symbols for a physical sidelink broadcast channel (PSBCH) which is transmitted in the subframe in which the synchronization signal is transmitted, is configured to be less than a number of DMRS symbols for a different D2D channel.

2. The method of claim 1,
   wherein the first root index and the second root index which are used in the second physical format are configured differently from a third root index and a fourth root index used in the first physical format and
   wherein a sum of the first root index and the second root index is configured to be identical to a sum of the third root index and the fourth root index.

3. The method of claim 1, wherein a difference between the number of DMRS symbols for the PSBCH and the number of DMRS symbols for the different D2D channel corresponds to 'N+M' which is a total number of the synchronization symbols.

4. The method of claim 1, wherein the second physical format is used for a frequency band higher than a frequency band used by the first physical format or the second physical format is used when latency shorter than latency by the first physical format is required.

5. The method of claim 4, wherein a number of symbols constructing transmission time interval (TTI) of the first physical format is configured as an integer multiple of a number of symbols constructing TTI of the second physical format.

6. The method of claim 1, further comprising:
receiving information on the physical format to be used among the first physical format and the second physical format from the transmission node.

7. A device supporting device to device (D2D) communication, comprising:
a receiver to receive a synchronization signal from a transmission node based on either a first physical format or a second physical format; and
a processor to perform synchronization with the transmission node based on the synchronization signal,
wherein when the second physical format is used, M numbers of synchronization symbols in addition to N numbers of synchronization symbols used in the first physical format are set in a same subframe and
wherein N+M numbers of synchronization symbols contained in the same subframe comprises a first synchronization symbol to which a first Zadoff-Chu sequence generated through a first root index is mapped and a second synchronization symbol to which a second Zadoff-Chu sequence generated through a second root index is mapped, and
wherein if the second physical format is used, a number of demodulation reference signal (DMRS) symbols for a physical sidelink broadcast channel (PSBCH) which is transmitted in the subframe in which the synchronization signal is transmitted, is configured to be less than a number of DMRS symbols for a different D2D channel.

8. A method of transmitting a signal by a device supporting device to device (D2D) communication through a physical format adaptive to wireless communication environment, the method comprising:
generating a synchronization signal based on either a first physical format or a second physical format; and
transmitting the synchronization signal to a reception node,
wherein when the second physical format is used, M numbers of synchronization symbols in addition to N numbers of synchronization symbols used in the first physical format are set in a same subframe and
wherein N+M numbers of synchronization symbols contained in the same subframe comprises a first synchronization symbol to which a first Zadoff-Chu sequence generated through a first root index is mapped and a second synchronization symbol to which a second Zadoff-Chu sequence generated through a second root index is mapped, and
wherein if the second physical format is used, a number of demodulation reference signal (DMRS) symbols for a physical sidelink broadcast channel (PSBCH) which is transmitted in the subframe in which the synchronization signal is transmitted, is configured to be less than a number of DMRS symbols for a different D2D channel.

9. The method of claim 8, wherein the first root index and the second root index which are used in the second physical format, are configured differently from a third root index and a fourth root index used in the first physical format and
wherein a sum of the first root index and the second root index is configured to be identical to a sum of the third root index and the fourth root index.

10. The method of claim 8, wherein a difference between the number of DMRS symbols for the PSBCH and the number of DMRS symbols for the different D2D channel corresponds to 'N+M' which is a total number of the synchronization symbols.

11. The method of claim 8, wherein the second physical format is used for a frequency band higher than a frequency band used by the first physical format or the second physical format is used when latency shorter than latency by the first physical format is required.

12. The method of claim 11, wherein a number of symbols constructing transmission time interval (TTI) of the first physical format is configured as an integer multiple of a number of symbols constructing TTI of the second physical format.

* * * * *